(12) United States Patent
Mitsutani et al.

(10) Patent No.: US 6,186,131 B1
(45) Date of Patent: Feb. 13, 2001

(54) FUEL INJECTION AMOUNT CONTROL METHOD AND APPARATUS FOR INTERNAL COMBUSTION ENGINE

(75) Inventors: Noritake Mitsutani, Toyota; Harufumi Muto, Nishikamo-gun, both of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/389,102

(22) Filed: Sep. 2, 1999

(30) Foreign Application Priority Data

Sep. 24, 1998 (JP) .................................................. 10-269755

(51) Int. Cl.$^7$ ................................. F02D 41/18; F01L 1/34
(52) U.S. Cl. ........................ 123/687; 123/488; 123/679; 123/692
(58) Field of Search ...................... 123/478, 480, 123/488, 494, 673, 679, 687, 691, 692; 73/118.2; 701/104, 109

(56) References Cited

U.S. PATENT DOCUMENTS 5,152,270 * 10/1992 Miyamoto ............................ 123/692
6,119,662 * 9/2000 Duty et al. ........................... 123/520

FOREIGN PATENT DOCUMENTS

| 8-189387 | 7/1996 | (JP) . |
| 9-177517 | 7/1997 | (JP) . |
| 10-9020 | 1/1998 | (JP) . |

* cited by examiner

Primary Examiner—Tony M. Argenbright
(74) Attorney, Agent, or Firm—Oliff & Berridge, PLC

(57) ABSTRACT

The engine of the present invention has a plurality of cylinders that are divided into a first group and a second group. An air flow meter for detecting an amount of air supplied to the engine is provided downstream of an air cleaner in an intake system. A crank angle sensor for detecting a rotational speed of the engine is provided adjacent to a crank shaft. The amount of air distributed to the first group and the amount of air distributed to the second group are calculated based on the detected amount of air and the detected rotational speed of the engine. The amount of fuel injected into the first group and the amount of fuel injected into the second group are corrected according to the calculated amounts of air distributed to the first and second groups.

29 Claims, 7 Drawing Sheets

MASS OF AIR G/N

ROTATIONAL SPEED N OF ENGINE

BASIC FUEL INJECTION TIME

OXYGEN CONCENTRATION SIGNAL $OX_1$

AIR-FUEL RATIO FEEDBACK CORRECTION FACTOR FAF(1)

OXYGEN
CONCENTRATION
SIGNAL OX₂

AIR-FUEL RATIO
FEEDBACK
CORRECTION
FACTOR FAF(2)

MASS OF AIR G/N

ROTATIONAL SPEED
N OF ENGINE

BASIC FUEL
INJECTION TIME

OXYGEN
CONCENTRATION
SIGNAL $OX_1$

AIR-FUEL RATIO
FEEDBACK
CORRECTION
FACTOR FAF(1)

FUEL INJECTION AMOUNT CONTROL METHOD AND APPARATUS FOR INTERNAL COMBUSTION ENGINE

INCORPORATION BY REFERENCE

The disclosure of Japanese Patent Application No. HEI 10-269755 filed on Sep. 24, 1998 including the specification, drawings and abstract is incorporated herein by reference in its entirety.

BACKGROUND OF THE INVENTION

1. Field of Invention

The present invention relates to a fuel injection amount control method and apparatus for an internal combustion engine and, more particularly, to a fuel injection amount control method and apparatus for an internal combustion engine having a plurality of cylinders or cylinder groups to which air supplied from a common intake passage is distributed.

2. Description of Related Art

In general, in controlling a fuel injection amount of an internal combustion engine, a fuel injection amount suited for an operating state of the engine detected by respective sensors is first calculated. This fuel injection amount is calculated as a time for supplying electricity to injectors, that is, a time for fuel injection. Based on the time for fuel injection, the injectors are driven so that the amount of fuel supplied to the engine is controlled.

In calculating the aforementioned time for fuel injection, the mass G of air per unit time is detected by the air flow meter, the rotational speed N of the engine is detected, for example, by the crank angle sensor, and the mass G of air per unit time is divided by the rotational speed N of the engine so as to obtain a mass G/N of air per rotation of the engine. Based on the mass G/N of air per rotation of the engine, a basic injection time is calculated. As shown in FIG. 6, this basic injection time has a linear relationship with the mass G/N of air per rotation of the engine. When the reference mass of air per rotation of the engine is equal to $(G/N)0$, the reference injection time is equal to KINJ. The reference mass $(G/N)0$ of air per rotation of the engine and the reference basic injection time KINJ are constants that are preliminarily determined according to a characteristic of the engine. Therefore, when the mass G/N of air per rotation of the engine is equal to G/N, the basic injection time is calculated according to a formula shown below.

$$\text{basic injection time}=((G/N)/(G/N)0)\times KINJ$$

If a load factor kl is defined as the mass G/N of air per rotation of the engine divided by the reference mass $(G/N)0$ of air per rotation of the engine, the basic injection time can also be expressed as shown below.

$$\text{basic injection time}=kl\times KINJ$$

For example, in the case of a V-type internal combustion engine wherein external air is distributed to the respective banks from a common intake passage and fuel is supplied from injectors provided separately for the respective banks, the aforementioned basic injection time is calculated as a time for injecting fuel from the injectors of both the banks. Therefore, half of the mass G of air per unit time, which is detected by the air flow meter provided in the common intake passage, is distributed to each of the banks. In other words, air of the mass 0.5G is distributed to each of the banks. Besides, the load factor for each of the banks is defined as 0.5kl. The basic injection time for each of the injectors is then calculated as follows.

$$\text{basic injection time}=0.5kl\times KINJ$$

The fuel injection time for each of the injectors is calculated by correcting the aforementioned basic injection time for each of the banks in accordance with an operating state of the engine.

One of the banks is referred to as a first bank, and the other is referred to as a second bank. The fuel injection time, the air-fuel ratio feedback correction factor and the air-fuel ratio learning value for the first bank are denoted by tau (1), FAF (1) and KGi (1) respectively. The fuel injection time, the air-fuel ratio feedback correction factor, and the air-fuel ratio learning value for the second bank are denoted by tau (2), FAF (2) and KGi (2) respectively. The correction factor and the invalid injection time that can be commonly used for both the banks are denoted by K and TAUV respectively. Then, the fuel injection times tau (1) and tau (2) are calculated using formulas shown below.

$$\text{tau}(1)=0.5kl\times KINJ\times FAF(1)\times KGi(1)\times K+TAUV$$

$$\text{tau}(2)=0.5kl\times KINJ\times FAF(2)\times KGi(2)\times K+TAUV$$

The air-fuel ratio feedback correction factors FAF (1) and FAF (2) are calculated separately for the respective banks in accordance with values detected by oxygen sensors that are provided in exhaust passages of the respective banks. Through correction of a fuel injection time based on the air-fuel ratio feedback correction factors FAF (1) and FAF (2), feedback control for making the air-fuel ratio close to a stoichiometric air-fuel ratio is performed. Such feedback control of the air-fuel ratio aims at optimally purifying combustion gas discharged from the respective banks in a three-way catalytic converter provided in the exhaust passage of the engine.

The air-fuel ratio learning values KGi (1) and KGi (2) are calculated separately for the banks, and initially set to "1.0". In order to correct a deviation in air-fuel ratio resulting from differences among bodies of the engine, time variability and conditions for use, these learning values KGi (1) and KGi (2) are calculated based on the aforementioned air-fuel ratio feedback correction factors FAF (1) and FAF (2), for respective learning zones that are classified according to a mass G of air.

The correction factor K is used to correct effects of a transient state or the like. The invalid injection time TAUV is added for correction as an operation delay time that starts with the supply of a driving signal and ends with actual injection of fuel from the injector.

Based on the fuel injection times tau (1) and tau (2) calculated separately for the banks, the injectors of the respective banks are driven so that the fuel injection amount is controlled.

As a prerequisite of calculation of the fuel injection times tau (1) and tau (2) for the respective banks in the aforementioned V-type internal combustion engine, half of the mass G of air per unit time that is detected by an air flow meter provided in a common intake passage is distributed to each of the banks. In other words, air of the mass 0.5G needs to be distributed to each of the banks. However, the inventors of the present invention have confirmed that the mass of air distributed to the first bank differs from the mass of air distributed to the second bank depending on the operating state of the engine. Therefore, if air of the mass 0.55G is distributed to the first bank and air of the mass 0.45G is distributed to the second bank, the basic injection time for the first bank is calculated as a time shorter than a time that should actually be calculated, and the basic injection time for the second bank is calculated as a time longer than a time that should actually be calculated. In the case where the basic injection time for each of the banks has been thus calculated, control patterns of a fuel injection amount will be described with reference to time charts shown in FIGS. 7A to 7B and FIGS. 8A and 8B. As shown in FIGS. 7A and 7B, the mass G/N of air per rotation of the engine is constant, and only the rotational speed N of the engine changes (increases) after a time t11.

In such a case, as indicated by a solid line and an alternate long and short dash line in FIG. 7A, the mass (G/N)1 of air per rotation of the engine for the first bank is maintained at 0.5 G/N before the time t11, and increases with lapse of time after the time t11. Further, as indicated by the solid line and a broken line in FIG. 7A, the mass (G/N)2 of air per rotation of the engine for the second bank is maintained at 0.5 G/N, and decreases with lapse of time after the time t11 in a manner corresponding to the increase in mass (G/N)1 of air.

Since the mass G/N of air per rotation of the engine is constant, the basic injection time for each of the banks as calculated based on the aforementioned formula assumes a constant value of 0.5kl×KINJ (See FIG. 7C). Therefore, the basic injection time for the first bank is calculated as a time shorter than a time that should intrinsically be calculated, with respect to a mass (G/N)1 of air for the first bank, which mass increases after the time t11. The second injection time is calculated as a time longer than a time that should intrinsically be calculated, with respect to a mass (G/N)2 of air for the second bank, which mass decreases after the time t11.

If feedback control of the air-fuel ratio is performed in such a case, the fuel injection time for the first bank is corrected afterwards in response to an increase in mass (G/N)1 of air for the first bank. Accordingly, as shown in FIG. 7D, the value OX1 detected by the oxygen sensor provided in the exhaust passage of the first bank is detected on the lean side from the time t11 to a time t12 which is relatively far apart from the time t11. From the time t11 to the time t12, the detected value OX1 is smaller than a reference value corresponding to the stoichiometric air-fuel ratio. As shown in FIG. 7E, the air-fuel ratio feedback correction factor FAF (1) for the first bank keeps increasing until the time t12.

On the other hand, the basic injection time for the second bank is also corrected afterwards in response to a decrease in mass (G/N)2 of air for the second bank. Accordingly, as shown in FIG. 8A, the value OX2 detected by the oxygen sensor provided in the exhaust passage of the second bank is detected on the rich side from the time t11 to a time t13 which is relatively far apart from the time t11. From the time t11 to the time t13, the detected value OX2 is greater than a reference value corresponding to the stoichiometric air-fuel ratio. As shown in FIG. 8B, the air-fuel ratio feedback correction factor FAF (2) for the second bank keeps decreasing until the time t13.

Thus, if the air-fuel ratio remains deviated from the stoichiometric air-fuel ratio toward the lean side (the first bank) or the rich side (the second bank) for a long time, the combustion gas discharged from the respective banks may not be sufficiently purified in the three-way catalytic converter.

The continuous deviation from the stoichiometric air-fuel ratio as described above has an effect on calculation of the aforementioned air-fuel ratio learning values KGi(1) and KGi(2). Therefore, an error may occur in the learning process.

Furthermore, in addition to the feedback control of the aforementioned air-fuel ratio, the control of the fuel injection amount is performed by correcting the aforementioned basic injection time in accordance with an operating state of the engine. Thus, it may not be possible to obtain an appropriate air-fuel ratio or to ensure the operability of the engine in accordance with the operating state of the engine.

In order to prevent the air supplied from the common intake passage from being distributed non-homogeneously to the respective banks, an air flow meter may be provided in each of the banks so that the mass of air can be detected separately for the banks. In this case, however, another problem such as a rise in manufacturing costs occurs.

Further, in the case of an engine control apparatus disclosed in Japanese Patent Application Laid-Open No. HEI 10-9020, feedback control of an air-fuel ratio is performed in consideration of non-homogeneous distribution of purge gas to left and right banks. However, this apparatus does not take any measures against the non-homogeneous distribution of air from the common intake passage to the respective banks (the first and second banks).

SUMMARY OF THE INVENTION

The present invention has been made in the light of the above-described circumstances. It is an aspect of the present invention to provide a fuel injection amount control apparatus for an internal combustion engine capable of setting a suitable fuel injection amount for each of a plurality of cylinder groups in accordance with an amount of air distributed to each of the cylinder groups from a common intake passage.

In view of the above, preferred embodiments of the invention provide a fuel injection amount control apparatus including an internal combustion engine, an air amount detector, an operating state detector, a fuel injection amount calculator, a distributed air amount calculator, a corrected fuel injection amount calculator, and a fuel injector. The internal combustion engine has a plurality of cylinders that are classified into at least two cylinder groups. The air amount detector detects an amount of air supplied to the engine, and is provided in a common intake passage for the cylinder groups. The operating state detector detects an operating state of the engine. The fuel injection amount calculator calculates an amount of fuel injected from each of the cylinder groups based on the detected amount of air. The distributed air amount calculator calculates an amount of air distributed to each of the cylinder groups based on the detected operating state. The fuel injection amount corrector module corrects the calculated fuel injection amount based on the calculated amount of air distributed. The fuel injector injects fuel into each of the cylinder groups based on the corrected fuel injection amount.

According to preferred embodiments of the present invention, the distributed air calculator calculates an amount of air distributed to each of the cylinder groups in accordance with an operating state of the engine. Based on the calculated amount of distributed air for each of the cylinder groups, the fuel injection amount for each of the cylinder groups is corrected. As a result, fuel of an amount reflecting the amount of air distributed to each of the cylinder groups is injected from each of the cylinder groups. Thus, it is possible to obtain an air-fuel ratio suited for an operating state of the engine and to achieve a fuel injection amount suited to ensure the operability of the engine.

BRIEF DESCRIPTION OF THE DRAWINGS

The foregoing and further objects, features and advantages of the present invention are directed in or will become apparent from the following description of preferred embodiments with reference to the accompanying drawings, wherein.

DETAILED DESCRIPTION OF PREFERRED EMBODIMENTS

Figure 1:
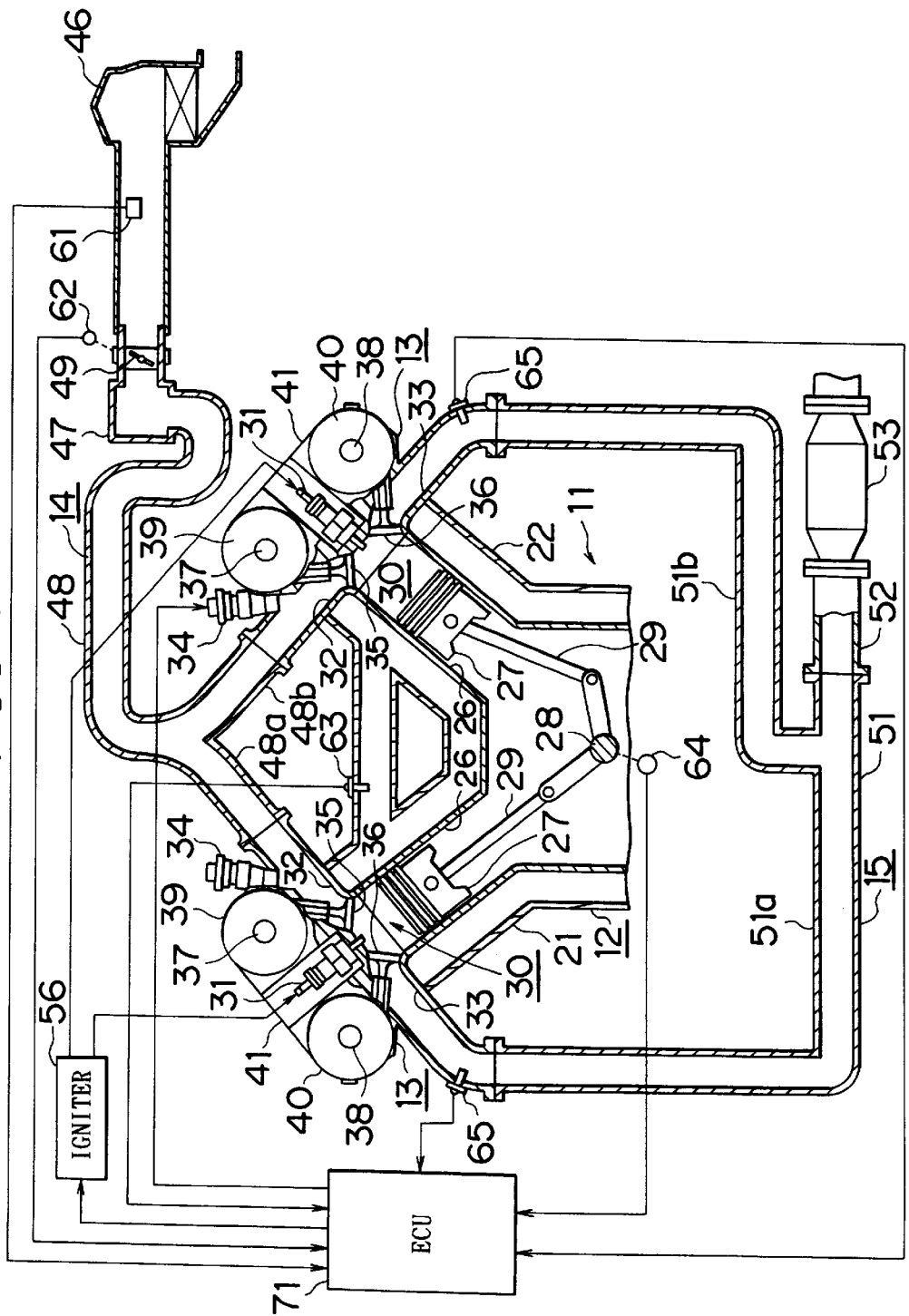
FIG. 1 is a schematic diagram showing the outline of an engine system to which a fuel injection amount control apparatus according to one preferred embodiment of the present invention is applied.

Hereinafter, a fuel injection amount control apparatus according to one preferred embodiment of the present invention will be described in detail with reference to the accompanying drawings. First of all, the structure of an engine system to which the present embodiment is applied will be described with reference to FIG. 1. As shown in FIG. 1, the engine system is mainly composed of a V-type gasoline engine 11 that serves as an internal combustion engine. The engine 11 is provided with a cylinder block 12, a cylinder head 13, an intake system 14 and an exhaust system 15.

The cylinder block 12 has branches forming a shape of V. One of the branches (on the left side in FIG. 1) has a first bank 21, and the other (on the right side in FIG. 1) has a second bank 22. Cylinders are divided into two groups, one of which belongs to the first bank 21 and the other of which belongs to the second bank 22. Each of the banks 21 and 22 has a cylinder 26. A piston 27, which is reciprocally provided in each cylinder 26, is connected to a crank shaft 28 via a connecting rod 29. The crank shaft 28 is an output shaft of the engine 11. The connecting rod 29 converts reciprocating motion of the piston 27 into rotation of the crank shaft 28.

The cylinder head 13 is attached to an upper end of each of the banks 21 and 22. In each of the cylinders 26, a combustion chamber 30 is formed between the upper end of the piston 27 and the cylinder head 13.

An ignition plug 31, which is provided so as to correspond to each of the combustion chambers 30, ignites mixture that is introduced into the corresponding combustion chamber 30. Likewise, an intake port 32 and an exhaust port 33, which are provided so as to correspond to each of the combustion chambers 30, communicate with the intake system 14 and the exhaust system 15 respectively. Thus, the intake port 32 and the exhaust port 33 partially constitute an intake passage and an exhaust passage respectively. An injector 34, which is provided so as to correspond to each of the combustion chambers 30, injects fuel toward the corresponding combustion chamber 30.

An intake valve 35, which is provided so as to correspond to each of the combustion chambers 30, opens and closes the port 32, while an exhaust valve 36, which is provided so as to correspond to each of the combustion chambers 30, opens and closes the port 33. Rotation of an intake-side cam shaft 37 and an exhaust cam shaft 38 causes rotation of cams (not shown) that are attached to the shafts 37 and 38 respectively, whereby the valves 35 and 36 are opened and closed respectively. Timing pulleys 39 and 40, which are attached to leading ends of the cam shafts 37 and 38 respectively, are connected to the crank shaft 28 via a timing belt 41 (it is not shown in the drawings how the timing pulleys 39 and 40 are connected to the crank shaft 28).

That is, while the engine 11 is in operation, a rotational force of the crank shaft 28 is transmitted to the cam shafts 37 and 38 via the timing belt 41 and the timing pulleys 39 and 40. Rotation of the cam shafts 37 and 38 causes the valves 35 and 36 to operate respectively. In synchronization with rotation of the crank shaft 28, that is, in accordance with reciprocating motion of the piston 27, the valves 35 and 36 are driven to be opened and closed at a predetermined timing (hereinafter referred to as the "valve timing"). In the aforementioned construction, rotation of the crank shaft 28 is transmitted to the cam shafts 37 and 38 via the timing belt 41 and the timing pulleys 39 and 40, and rotation of the cam shafts 37 and 38 causes the valves 35 and 36 to operate respectively. Instead, however, there may be provided a variable timing mechanism wherein rotational speeds of the cam shafts 37 and 38 can be changed independently of rotation of the crank shaft 28. The intake valve 35, which is driven to be opened and closed, brings the intake port 32 and the combustion chamber 30 into and out of communication respectively. The exhaust valve 36, which is driven to be opened and closed, brings the exhaust port 33 and the combustion chamber 30 into and out of communication respectively.

The intake system 14 constitutes the intake passage and is provided with an air cleaner 46, a surge tank 47 and an intake manifold 48. Branch pipes 48a and 48b branch off from the intake manifold 48 on the downstream side thereof. The branch pipes 48a and 48b communicate with the intake ports 32 of the banks 21 and 22 respectively. Therefore, external air is sucked into the combustion chamber 30 via the air cleaner 46, the surge tank 47, the intake manifold 48 (the branch pipes 48a and 48b) and the intake ports 32 of the banks 21 and 22. Disposed downstream of the surge tank 47 is a throttle valve 49, whose opening degree is changed based on an operation of an accelerator. By changing an opening degree of the throttle valve 49, the amount of air sucked into the combustion chamber 30 is adjusted.

On the other hand, the exhaust system 15 constitutes the exhaust passage and is provided with an exhaust manifold 51, an exhaust pipe 52 and a three-way catalytic converter 53. Branch pipes 51a and 51b branch off from the exhaust manifold 51 on the upstream side thereof, and communicate with the exhaust ports 33 of the banks 21 and 22 respectively. The branch pipes 51a and 51b merge on the downstream side of the exhaust manifold 51 and communicate with the exhaust pipe 52. The exhaust pipe 52 in turn communicates with the three-way catalytic converter 53. Combustion gas discharged from the combustion chamber 30 of the bank 21 and combustion gas discharged from the combustion chamber 30 of the bank 22 merge on the downstream side of the branch pipes 51a and 51b of the exhaust manifold S1. The combustion gas then passes through the three-way catalytic converter 53 via the exhaust pipe 52. In passing through the three-way catalytic converter 53, the combustion gas is purified. After that, the combustion gas is discharged to the outside.

A high voltage outputted from an igniter 56 is applied to the ignition plug 31. The ignition timing for the ignition plug 31 is determined based on a timing at which a high voltage is outputted from the igniter 56. The ignition plug 31 causes the mixture, which is made up of intake air from the intake passage (the intake system 14) and fuel injected from the injector 34, to explode in the combustion chamber 30, whereby the engine 11 obtains a driving force. Thereafter, the combustion gas is discharged into the exhaust passage (the exhaust system 15) via the exhaust valve 36.

Further, in order to detect an operating state of the engine 11, an air flow meter 61, a throttle position sensor 62, a coolant temperature sensor 63, a crank angle sensor 64, oxygen sensors 65 serving as air-fuel ratio sensors, and the like are provided.

The air flow meter 61, which is provided downstream of the air cleaner 46 in the intake system 14, detects a mass G of air that is sucked into the engine 11 per unit time.

The throttle position sensor 62, which is provided in the vicinity of the throttle valve 49, detects an opening degree TA of the throttle valve 49 (throttle valve opening degree).

The coolant temperature sensor 63, which is provided in a water outlet housing or the like of the cylinder block 12, detects a temperature THW of coolant for the engine 11 (coolant temperature).

The crank angle sensor 64, which is provided adjacent to the crank shaft 28, detects a rotational speed N of the engine 11 (the crank shaft 28), a rotational angle of the crank shaft 28 (crank angle) corresponding to a specific cylinder, and the like.

One of the oxygen sensors 65 is provided in the branch pipe 51a, and the other oxygen sensor 65 is provided in the branch pipe 51b. The oxygen sensors 65 output oxygen concentration signals OX1 and OX2 respectively, which represent concentrations of oxygen in combustion gas discharged from the combustion chambers 30 of the first and second banks 21 and 22 respectively. The characteristic of these oxygen concentration signals OX1 and OX2 is that they undergo a sudden change in the vicinity of the stoichiometric air-fuel ratio. By utilizing this characteristic, the oxygen sensors 65 determine whether the air-fuel ratio of the mixture supplied is on the lean side or on the rich side with respect to the stoichiometric air-fuel ratio.

Then, the construction of an electronic control apparatus for managing and controlling the aforementioned engine system (hereinafter referred to as the "ECU") will be described with reference to a block diagram of FIG. 2.

In the illustrated embodiment, the engine controller (ECU 71) is implemented as a programmed general purpose computer. It will be appreciated by those skilled in the art that the controller can be implemented using a single special purpose integrated circuit (e.g., ASIC) having main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, micro controller or other processor device (CPU or MPU), either alone or in conjunction with one or more peripheral (e.g., integrated circuit) data and signal processing devices. In general, any sub-system (such as a component that determines or calculates a value or controls based on the value), device or assembly of devices on which a finite state machine capable of implementing the flowchart shown in FIG. 3 can be used as the controller or system that supplies information to the controller. A distributed processing architecture can be used for maximum data/signal processing capability and speed.

Figure 2:
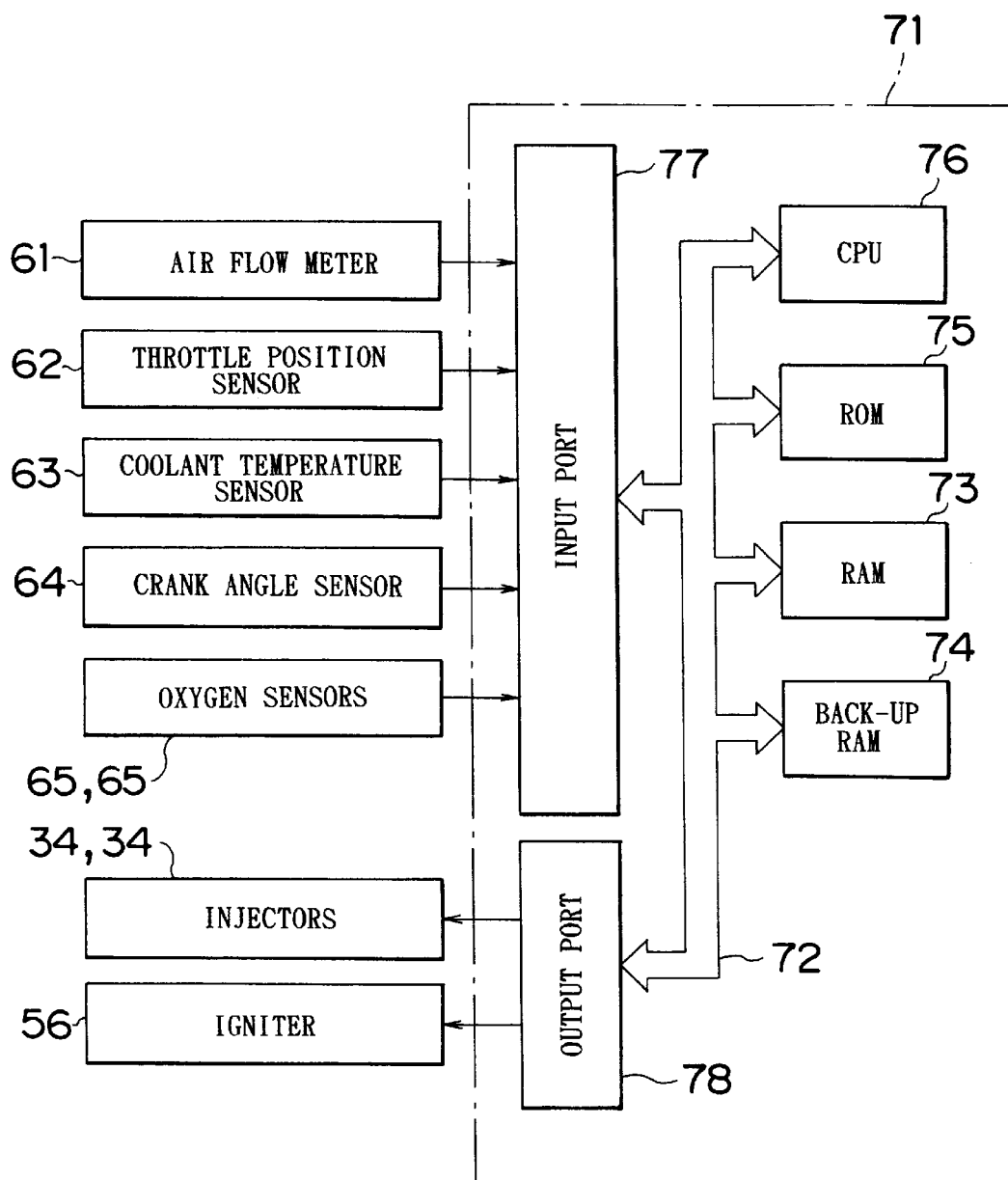
FIG. 2 is a block diagram showing the electric structure of the apparatus according to a preferred embodiment of the invention.

As shown in FIG. 2, the ECU 71 is composed of a digital computer. The ECU 71 has a RAM (random access memory) 73, a back-up RAM 74, a ROM (read only memory) 75, a CPU (central processing unit) 76 composed of a micro processor, an input port 77 and an output port 78, which are interconnected to one another via a bus 72.

The CPU 76 carries out various calculation processing according to a control program, initial data and the like that are preliminarily stored in the ROM 75. The RAM 73 temporarily stores a result of the calculation made by the CPU 76. The back-up RAM 74 is a non-volatile memory that is backed up by a battery, and maintains required calculation results and the like even after stop of the engine 11.

On the other hand, detection signals from the air flow meter 61, the throttle position sensor 62, the coolant temperature sensor 63, the crank angle sensor 64, the oxygen sensors 65 and the like are inputted to the input port 77. These sensors 61, 62, 63, 64, 65 and the like detect an operating state of the engine 11.

The output port 78 is connected to the respective injectors 34, igniters 56 and the like via corresponding driving circuits and the like. The ECU 71 (the CPU 76) suitably controls the injectors 34, the igniters 56 and the like according to the control program, the initial data and the like stored in the ROM 75, based on the detection signals from the respective sensors 61, 62, 63, 64, 65 and the like. The amount of fuel injected from the injector 34 is controlled based on a time of duration of a driving signal outputted to the injector 34, that is, on a fuel injection time.

Figure 3:
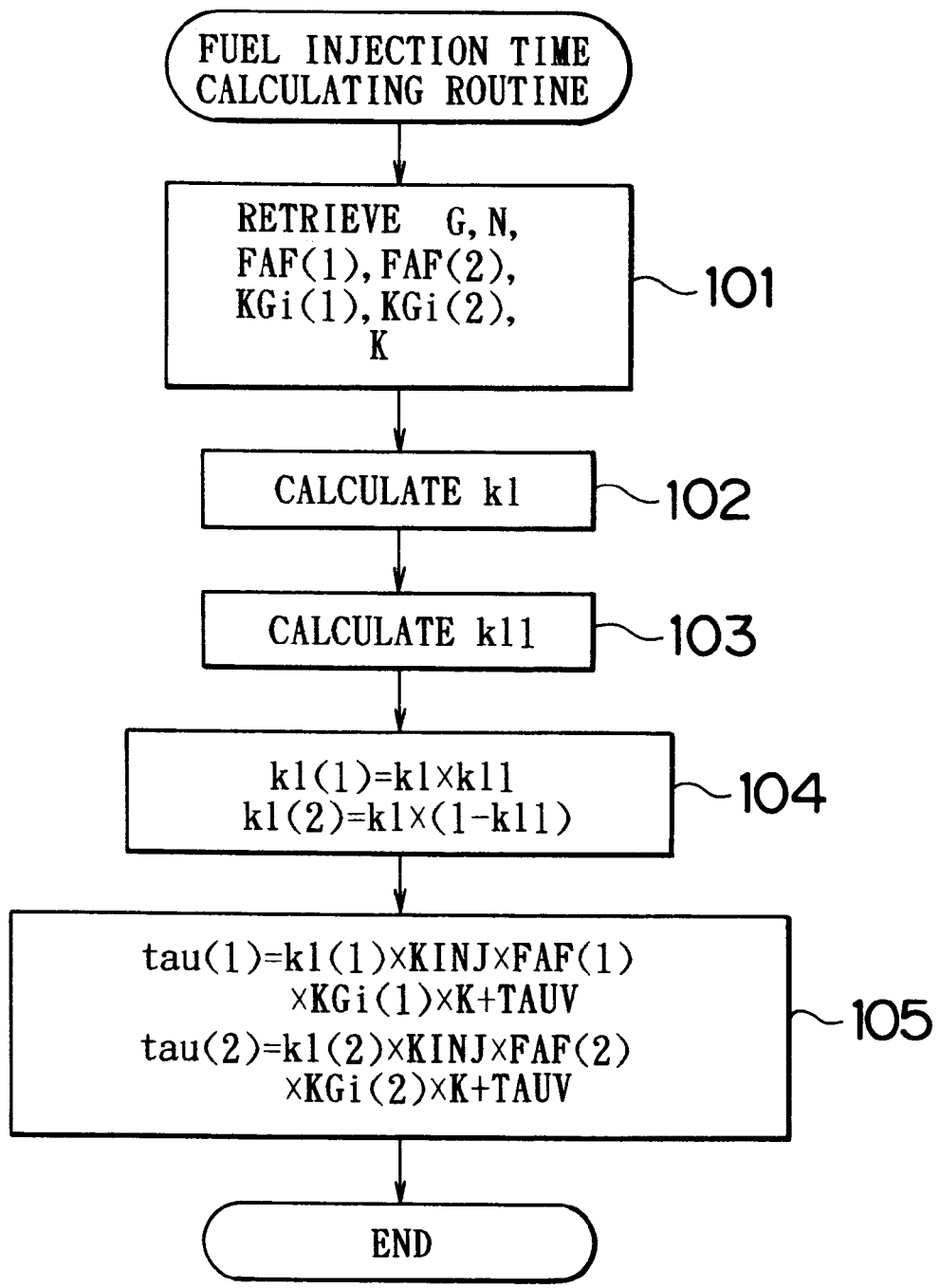
FIG. 3 is a flowchart showing a fuel injection time calculation routine according to a preferred embodiment of the invention.

A fuel injection time calculation routine, which is carried out by the thus-constructed ECU 71, will now be described based on FIG. 3. Based on a crank angle detected by the crank angle sensor 64, this routine is carried out as an interruption routine every time the crank shaft assumes a predetermined crank angle.

If the operation enters this routine, first of all in step 101, the CPU 76 retrieves an engine rotational speed N, an air mass G per unit time, air-fuel ratio feedback correction factors FAF (1) and FAF (2), air-fuel ratio learning values KGi (1) and KGi (2) and a correction factor K from the RAM 73 or the back-up RAM 74. The operation then proceeds to step 102.

The air-fuel ratio feedback correction factors FAF (1) and FAF (2) are determined or calculated for the first bank 21 and the second bank 22 respectively, in accordance with the oxygen concentration signals OX1 and OX2. The fuel injection time is corrected based on these air-fuel ratio feedback correction factors FAF (1) and FAF (2), whereby feedback control for making the air-fuel ratio closer to the stoichiometric air-fuel ratio is performed. Such feedback control of the air-fuel ratio is designed such that combustion gas discharged from the combustion chambers 30 of the banks 21 and 22 is optimally purified in the three-way catalytic converter. The air-fuel ratio feedback control is performed when the following conditions are satisfied. That is, the air-fuel ratio feedback control is performed if:

(a) various fuel increase corrections are not made;

(b) the supply of fuel is not suspended;

(c) the engine is not in high-load operation; and (d) the oxygen sensors 65 are activated.

If these conditions are not satisfied, the air-fuel ratio feedback correction factors FAF (1) and FAF (2) are set to "1.0".

The air-fuel ratio learning values KGi (1) and KGi (2) are calculated for the first and second banks 21 and 22 respectively, and initially set to "1.0". In order to correct a deviation in air-fuel ratio resulting from differences among bodies of the engine 11, time variability and conditions for use, these learning values KGi (1) and KGi (2) are calculated based on the aforementioned air-fuel ratio feedback correction factors FAF (1) and FAF (2), for respective learning zones that are classified according to a mass G of air.

Furthermore, the correction factor K is used to correct effects of a transient state or the like in accordance with the operating state of the engine 11. The operating state of the engine 11 is detected by the sensors other than the aforementioned oxygen sensor 65, that is, by the sensors 61, 62, 63 and 64.

The operation then proceeds to step 102, where the CPU 76 calculates a load factor kl according to the following formula.

$$kl=((G/N)/(G/N)0)$$

Figure 6:
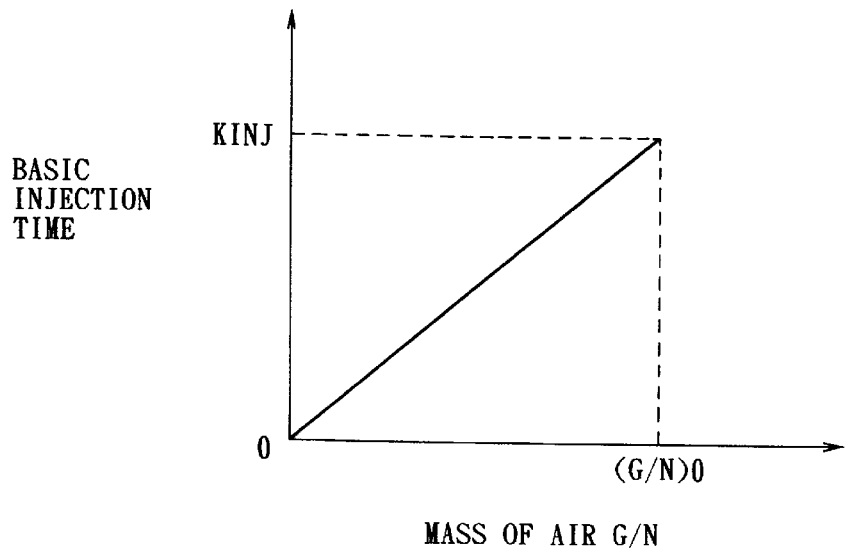
FIG. 6 is a graph showing a relationship between mass of air per rotation of the engine and basic injection time.
Figure 7A:
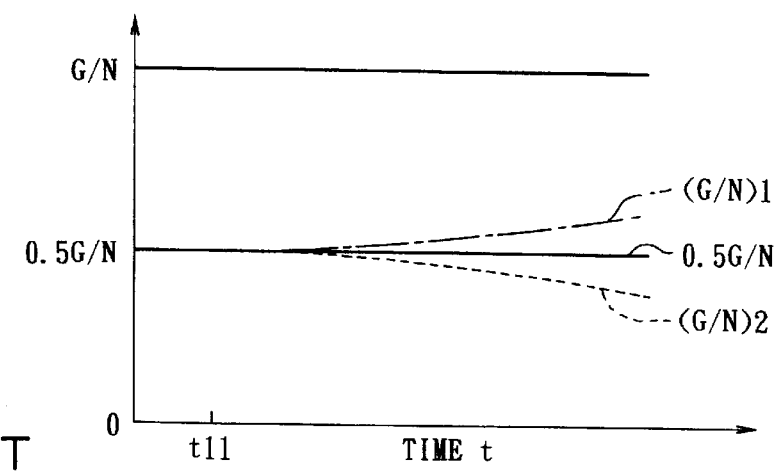
FIGS. 7A to 7E are time charts showing control patterns of a fuel injection amount in a conventional fuel injection amount control apparatus.
Figure 7B:
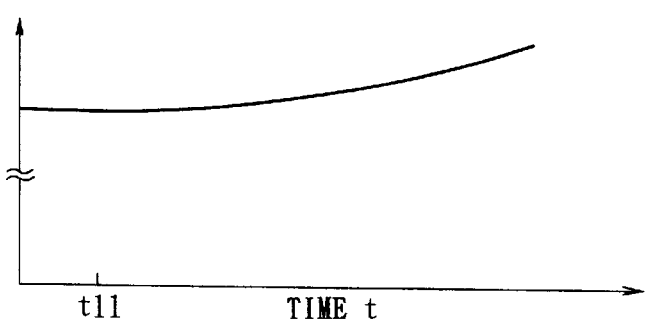
Figure 7C:
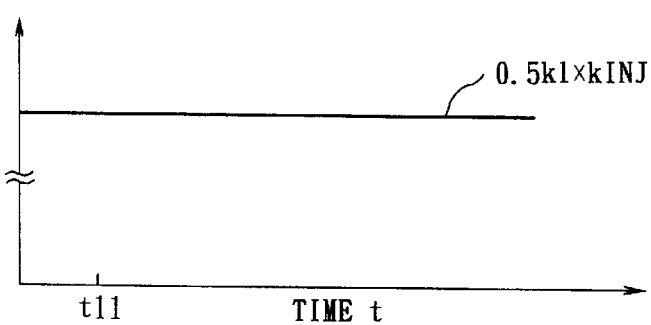
Figure 7D:
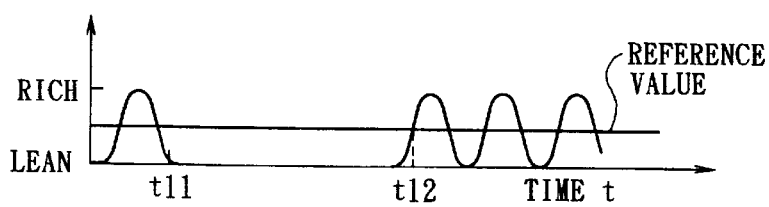
Figure 7E:
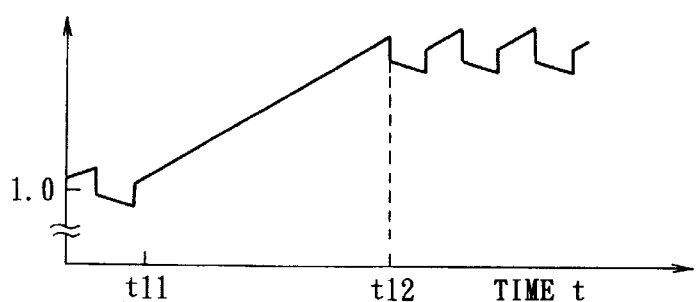
Figure 8A:
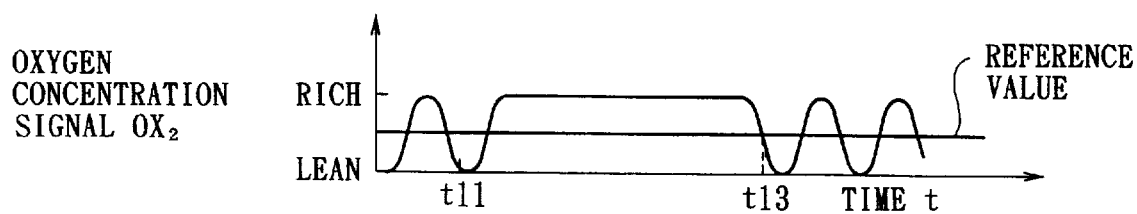
FIGS. 8A and 8B are time charts showing control patterns of a fuel injection amount in the conventional fuel injection amount control apparatus.
Figure 8B:
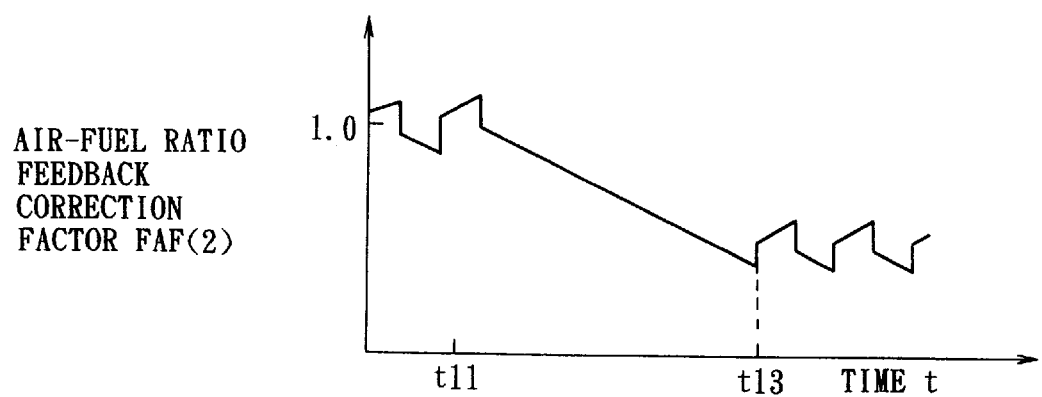

In this formula, (G/N)0 represents a mass of air per rotation of the engine. The basic injection time is set to a reference basic injection time KINJ as shown in FIG. 6. The reference mass (G/N)0 of air per rotation of the engine and the reference basic injection time KINJ are predetermined constants that are determined according to a characteristic of the engine 11. As shown in FIG. 6, the mass G/N of air per rotation of the engine has a linear relationship with the reference injection time. Thus, the reference injection time for the engine 11 as a whole is calculated by multiplying the reference basic injection time KINJ by the load factor kl.

After the CPU 76 has calculated the load factor kl in step 102, the operation proceeds to step 103.

In step 103, the CPU 76 calculates a distribution factor kl1 for the mass of air distributed to the first bank 21, using a predetermined map that is based on the rotational speed N of the engine and the load factor kl. The map of the distribution factor kl1 is made as follows. That is, for each body of the engine 11, when the rotational speed N of the engine and the load factor kl assume certain values, the mass of air distributed to the first bank 21 is obtained through experiments. The thus-obtained mass of air is divided by a mass of air supplied to the entire engine 11. In this embodiment, the mass of air supplied to the entire engine 11 is distributed to the first bank 21 and the second bank 22. Thus, in the case where the mass of air is homogeneously distributed to the banks 21 and 22, the distribution factor kl is set to "0.5". In the case where the mass of air distributed to the first bank 21 is greater than the mass of air distributed to the second bank 22, the distribution factor kl is set greater than "0.5". Conversely, in the case where the mass of air distributed to the first bank 21 is smaller than the mass of air distributed to the second bank 22, the distribution factor kl1 is set smaller than "0.5".

After the CPU 76 has calculated the distribution factor kl1 in step 103, the operation proceeds to step 104. In step 104, the CPU 76 calculates a load factor kl (1) for the first bank 21 and a load factor kl (2) for the second bank 22 according to the following formulas.

$$kl(1)=kl \times kl1$$

$$kl(2)=kl \times (1-kl1)$$

The operation then proceeds to step 105.

In step 105, the CPU 76 calculates fuel injection times tau (1) and tau (2) for the first and second banks 21 and 22 according to the following formulas.

$$tau(1)=kl(1) \times KINJ \times FAF(1) \times KGi(1) \times K+TAUV$$

$$tau(2)=kl(2) \times KINJ \times FAF(2) \times KGi(2) \times K+TAUV$$

In these formulas, the invalid injection time TAUV is added for correction as an operation delay time that starts with the supply of a driving signal from the ECU 71 to the injector 34 and ends with actual injection of fuel from the injector 34.

As described above, the basic injection time is calculated by multiplying the load factor by the reference basic injection time KINJ. This embodiment adopts the load factors kl (1) and kl (2), which takes into account a difference in mass of air distributed to the first and second banks 21 and 22. Therefore, the basic injection time kl (1)×KINJ for the first bank 21 and the basic injection time kl (2)×KINJ for the second bank 22 reflect the aforementioned difference in mass of air distributed to the first and second banks 21 and 22. The fuel injection times tau (1) and tau (2) for the first and second banks 21 and 22 are calculated by correcting the basic injection times kl (1)×KINJ and kl (2)×KINJ for the first and second banks 21 and 22 that have been calculated as described above. Accordingly, the fuel injection times tau (1) and tau (2) are calculated as values suited for masses of air distributed to the respective banks 21 and 22.

After the CPU 76 has calculated the fuel injection times tau (1) and tau (2) for the first and second banks 21 and 22, the operation is temporarily terminated.

Based on the fuel injection times tau (1) and tau (2) that have been calculated as described above, the injectors 34 of the respective banks 21 and 22 are driven, so that fuel injection is carried out.

Figure 4A:
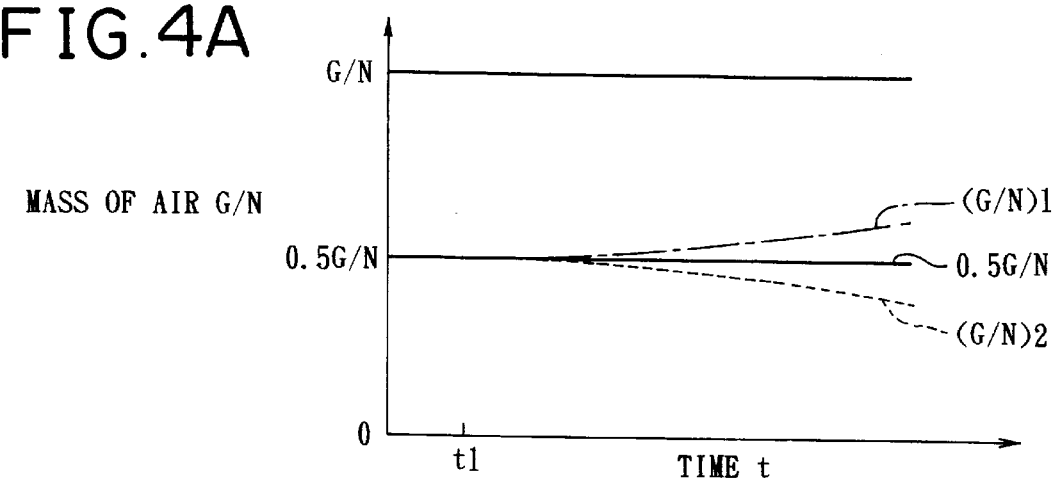
FIGS. 4A to 4E are time charts showing control patterns of a fuel injection amount according to a preferred embodiment of the invention.
Figure 4B:
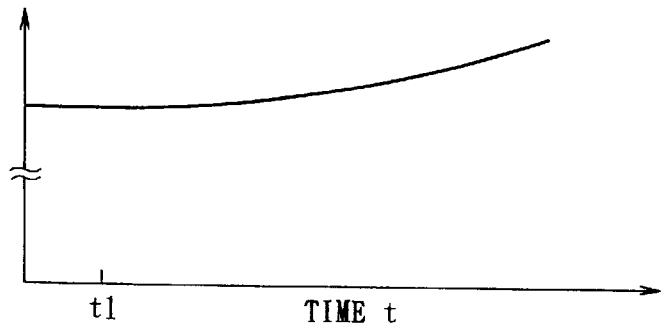

Control patterns of a fuel injection amount according to this embodiment will now be described with reference to time charts shown in FIGS. 4A to 4E and FIGS. 5A and 5B. As shown in FIGS. 4A and 4B, the mass G/N of air per rotation of the engine is constant, and only the rotational speed N of the engine changes (increases) after a time t1.

In such a case, as indicated by a solid line and an alternate long and short dash line in FIG. 4A, the mass (G/N) 1 of air per rotation of the engine for the first bank 21 is maintained at 0.5 G/N before a time t1, and increases with lapse of time after the time t1. Further, as indicated by the solid line and a broken line in FIG. 4A, the mass (G/N) 2 of air per rotation of the engine for the second bank 22 is maintained at 0.5 G/N, and decreases with lapse of time after the time t1 in a manner corresponding to the increase in mass (G/N) 1 of air.

Figure 4C:
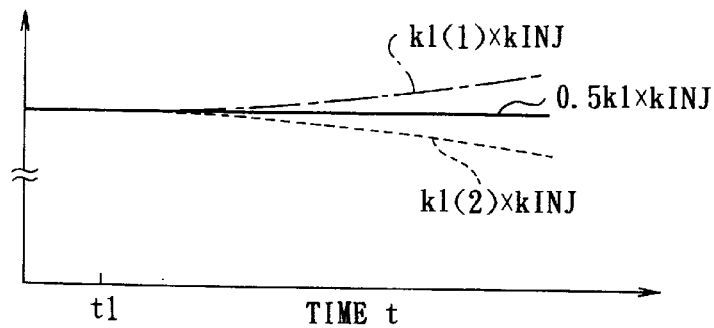
Figure 4D:
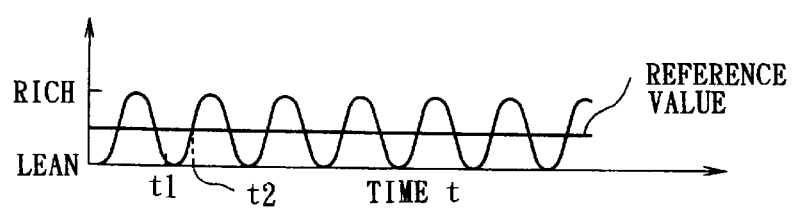
Figure 4E:
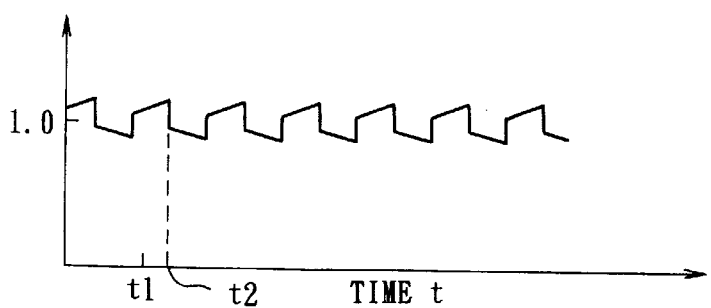

In this embodiment, as shown in FIG. 4C, the basic injection time kl (1)×KINJ for the first bank 21 is corrected to a relatively long period so as to correspond to the increase in mass (G/N) 1 of air distributed to the bank 21 after the time t1. Therefore, the fuel injection time tau (1) for the first bank 21 reflects the increase in mass (G/N) 1 of air distributed to the bank 21 after the time t1. In such a case, if feedback control of air-fuel ratio is performed, as shown in FIG. 4D, the oxygen concentration signal OX1 for the first bank 21 changes from a value smaller than a reference value corresponding to the stoichiometric air-fuel ratio to a large value at a time t2, which is slightly after the time 1. That is, the graph shown in FIG. 4D shifts from the lean side to the rich side at the time t2. As shown in FIG. 4E, the air-fuel ratio feedback correction factor FAF (1) for the first bank 21 also stops increasing at the time t2.

Figure 5A:
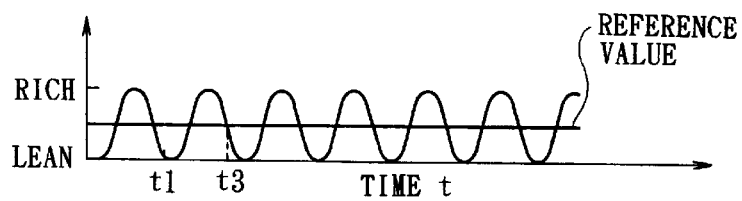
FIGS. 5A and 5B are time charts showing control patterns of a fuel injection amount according to a preferred embodiment of the invention.
Figure 5B:
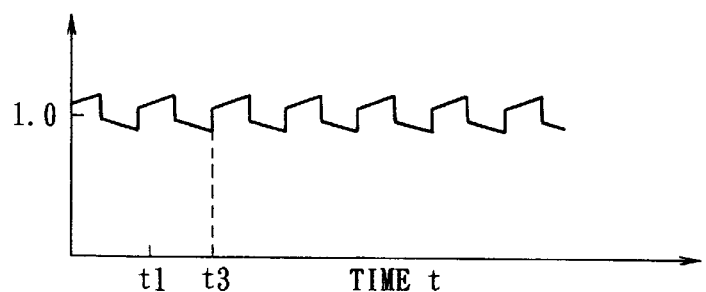

On the other hand, as shown in FIG. 4C, the basic injection time kl (2)×KINJ for the second bank 22 is corrected to a relatively short period so as to correspond to the decrease in mass (G/N) 2 of air distributed to the bank 22 after the time t1. Therefore, the fuel injection time tau (2) for the first bank 22 reflects the increase in mass (G/N) 2 of air distributed to the bank 22 after the time t1. In such a case, if feedback control of air-fuel ratio is performed, as shown in FIG. 5A, the oxygen concentration signal OX2 for the first bank 22 changes from a value larger than a reference value corresponding to the stoichiometric air-fuel ratio to a small value at a time t3, which is slightly after the time 1. That is, the graph shown in FIG. 5A shifts from the rich side to the lean side at the time t3. As shown in FIG. 5B, the air-fuel ratio feedback correction factor FAF (2) for the second bank 22 also stops decreasing at the time t3.

In this manner, it is possible to enhance the accessibility of the feedback control to the stoichiometric air-fuel ratio in both the banks 21 and 22. Thus, the combustion gas discharged from the combustion chambers 30 of the banks 21 and 22 can be suitably purified in the three-way catalytic converter 53.

The air-fuel ratio learning values KGi (1) and KGi (2) are calculated based on the feedback correction factors FAF (1) and FAF (2) in a state where the accessibility of the feedback control has been enhanced as described above. Therefore, the air-fuel ratio learning control can be suitably performed.

Furthermore, it is not limited to the case of the aforementioned feedback control of air-fuel ratio that the fuel injection times tau (1) and tau (2) for the second bank 22 are calculated by correcting the aforementioned basic injection time by means of the correction factor K, which takes into account effects of a transient state or the like. Corrections of the effects of the transient state or the like are made as follows.

(a) correction for increasing fuel injection amount after start of the engine: The fuel injection amount is increased for a certain period of time in starting the engine so as to stabilize the rotational speed N of the engine. The basic injection time is corrected in accordance with the coolant temperature THW and the rotational speed N of the engine.

(b) correction for increasing fuel injection amount for warm-up: The fuel injection amount is increased while the engine is cold, so that the operability of the engine is ensured. The basic injection time is corrected in accordance with the coolant temperature THW.

(c) correction for increasing fuel injection amount for output range: The fuel injection amount is increased when the engine load is in an output range, so that the operability of the engine is ensured. The basic injection time is corrected in accordance with the throttle valve opening degree TA and the rotational speed N of the engine.

(d) correction for increasing fuel injection amount for acceleration: The fuel injection amount is increased so as to enhance the response performance at the time of acceleration and to obtain a desirable air-fuel ratio. The basic injection time is corrected in accordance with the coolant temperature THW, the throttle valve opening degree TA and the mass G of air.

(e) correction for reducing fuel injection amount for deceleration: The fuel injection amount is reduced at the time of deceleration so as to enhance operation performance and fuel consumption. The basic injection time is corrected in accordance with the coolant temperature THW and the mass G of air.

The basic injection time is corrected in consideration of the difference in mass of air distributed. Thus, even during the transient state as stated above, the fuel injection times tau (1) and tau (2) can be suitably calculated. As a result, it is possible to obtain an air-fuel ratio suited for an operating state of the engine 11 and to ensure the operability of the engine 11.

As described in detail, this embodiment makes it possible to achieve at least the following effects. That is, this embodiment makes it possible to obtain a suitable air-fuel ratio in accordance with an operating state of the engine, and to ensure the operability of the engine. The distribution factor kl1 for the first bank 21 is calculated using the map that is based on the load factor kl and the rotational speed N of the engine. Therefore, the distribution factor kl1 can be suitably calculated. In both the banks 21 and 22, the accessibility of the feedback control to the stoichiometric air-fuel ratio can be enhanced. Both the combustion gas discharged from the combustion chamber 30 of the bank 21 and the combustion gas discharged from the combustion chamber 30 of the bank 22 can be suitably purified in the three-way catalytic converter 53, so that the air-fuel ratio learning control can be suitably performed. Furthermore, the cylinders are divided into two groups, one of which belongs to the first bank 21 and the other of which belongs to the second bank 22. The fuel injection amount control is performed separately for the banks 21 and 22. Therefore, the structure for performing the control can be simplified.

The present invention is not limited to the aforementioned embodiment, which may be modified, e.g., as follows.

In the aforementioned embodiment, the oxygen sensors 65 are provided in the branch pipes 51a and 51b of the exhaust manifold 51 respectively, and the feedback control for achieving the stoichiometric air-fuel ratio is performed separately for the banks 21 and 22 based on the oxygen concentration signals OX1 and OX2 outputted from the sensors 65. However, a single common oxygen sensor may be provided on the downstream side where the branch pipes 51a and 51b merge. In this case, the feedback control for achieving the stoichiometric air-fuel ratio is performed separately for the banks 21 and 22 based on an oxygen concentration signal outputted from the oxygen sensor.

In the aforementioned embodiment, the cylinders of the V-type engine 11 is divided into two groups, one of which belongs to the first bank 21 and the other of which belongs to the second bank 22. Then, the distribution factor kl1 for the first bank 21 is calculated, and the fuel injection times tau (1) and tau (2) for the banks 21 and 22 are calculated. However, as long as an engine has a plurality of cylinders that can be classified into the same or less number of groups, the engine can be employed in the present invention. In such an engine, external air is supplied thereto through a common intake passage, and fuel is injected from injectors that are provided separately for respective cylinder groups. Also in this case, distribution factors (amounts of air distributed) for the respective cylinder groups are calculated, and lengths of time for fuel injection for the respective cylinder groups are calculated based on the calculated distribution factors (the amounts of air distributed). Thereby, substantially the same effect can be achieved as in the aforementioned embodiment.

In the aforementioned embodiment, the oxygen sensors 65 are provided in the branch pipes 51a and 51b of the exhaust manifold 51 respectively, and the feedback control for achieving the stoichiometric air-fuel ratio is performed based on the oxygen concentration signals OX1 and OX2 outputted from the sensors 65. However, a lean mixture sensor may be provided instead of the oxygen sensors 65, so that the feedback control for achieving the stoichiometric air-fuel ratio can be performed based on a detection value outputted from the lean mixture sensor. As a lean burn system, the aforementioned lean mixture sensor may be designed to detect a predetermined lean air-fuel ratio such that the rate of fuel consumption becomes optimal and that the discharge amount of nitrogen oxide and the degree of torque fluctuations remain within respective permissible ranges. In the case where the feedback control for achieving the aforementioned lean air-fuel ratio is performed based on a value detected by the lean mixture sensor, the accessibility of the feedback control to the lean air-fuel ratio can be enhanced in both the banks 21 and 22. Thus, it is possible to optimize the rates of fuel consumption for the banks 21 and 22 and to maintain the discharge amount of nitrogen oxide and the degree of torque fluctuations within respective permissible ranges.

In the aforementioned embodiment, the distribution factor kl for the amount of air distributed to the first bank 21 is calculated using the map that is based on the load factor kl and the rotational speed N of the engine. However, the aforementioned distribution factor kl may be calculated using a map that is based on the mass G/N of air per rotation of the engine or a map that is based on the mass G of air per unit time and the rotational speed N of the engine.

In the aforementioned embodiment, the air flow meter 61 is provided downstream of the air cleaner 46 so as to detect a mass G of air supplied to the engine 11 as an amount of air. However, for example, a vacuum sensor may be provided in the surge tank 47 so that the aforementioned amount of air can be calculated based on an intake pressure detected by the vacuum sensor. In this case, the basic injection time is calculated using a predetermined map that is based on the intake pressure and the rotational speed N of the engine. The distribution factor (kl1) for the amount of air supplied to the first bank 21 is calculated using a map that is based on the intake pressure (the amount of air) and the rotational speed N of the engine. Based on the thus-calculated distribution factor, the aforementioned basic injection time is corrected, whereby substantially the same effect can be achieved as in the aforementioned embodiment.

In the case where such a vacuum sensor is used to detect an amount of air, a correction for stabilizing idling operation may be made with a view to correcting the basic injection time in consideration of the effects of a transient state or the like as described above. The correction for stabilizing idling operation aims at stabilizing the rotational speed of the engine during idling operation and is mainly designed to correct the basic injection time in accordance with an intake pressure and a rotational speed N of the engine. Because the basic injection time reflects a difference in amount of air distributed to the banks, the rotational speed of the engine during idling operation can be suitably stabilized.

In addition to the components of the engine system of the aforementioned embodiment, a variable valve timing mechanism may be provided so as to achieve a valve timing suited for an operating state of the engine 11. In this case, the degree of change in valve timing is detected as a degree VT of advancement of valve timing, which is detected by a cam angle sensor provided on the side of a corresponding cam shaft (either the intake-side cam shaft 37 or the exhaust-side cam shaft 38). The inventors of the present invention have confirmed that the mass of air distributed to the first bank 21 differs from the mass of air distributed to the second bank 22 also depending on the aforementioned degree of change in valve timing. Therefore, in the case of an engine system equipped with a variable valve timing mechanism, the distribution factor kl1 for the first bank is calculated using a predetermined map that is based on the rotational speed N of the engine, the load factor kl and the degree VT of advancement of valve timing. The map for the distribution factor kl is made as follows. That is, for each body of the engine 11, when the rotational speed N of the engine and the load factor kl assume certain values, the mass of air distributed to the first bank 21 is obtained through experiments. The thus-obtained mass of air is divided by a mass of air supplied to the entire engine 11. In such an engine system, the distribution factor kl for the first bank 21 is calculated based on the rotational speed N of the engine, the load factor kl and the degree VT of advancement of valve timing. Thus, the calculation of the distribution factor kl1 can be made suitably.

While the present invention has been described with reference to preferred embodiments thereof, it is to be understood that the present invention is not limited to the disclosed preferred embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A fuel injection amount control apparatus comprising:
   an internal combustion engine having a plurality of cylinders that are classified into at least two cylinder groups;
   an air amount detector that detects an amount of air supplied to the engine, the air amount detector being provided in a common intake passage for the cylinder groups;
   an operating state detector that detects an operating state of the engine;
   a fuel injection amount calculator that calculates an amount of fuel injected from each of the cylinder groups based on the detected amount of air;
   a distributed air amount calculator that calculates an amount of air distributed to each of the cylinder groups based on the detected operating state;
   a corrected fuel injection amount calculator that calculates a corrected fuel injection amount based on the calculated amount of air distributed; and
   a fuel injector that injects fuel into each of the cylinder groups based on the corrected fuel injection amount.

2. The fuel injection amount control apparatus according to claim 1, wherein the corrected fuel injection amount calculator makes a correction so as to increase the calculated fuel injection amount in accordance with an increase in the calculated amount of air distributed.

3. The fuel injection amount control apparatus according to claim 2, wherein:
the operating state detector is provided with an engine rotational speed detector that detects a rotational speed of the engine; and
the amount of air distributed is calculated based on the detected amount of air and the detected rotational speed of the engine.

4. The fuel injection amount control apparatus according to claim 3, further comprising:
an air-fuel ratio sensor that detects an air-fuel ratio of mixture in each of the cylinder groups provided in an exhaust passage for each of the cylinder groups; and
an air-fuel ratio feedback corrector that further corrects the corrected fuel injection amount, which has been corrected based on the detected air-fuel ratio, to perform feedback control such that the air-fuel ratio of mixture in each of the cylinder groups becomes a desired air-fuel ratio.

5. The fuel injection amount control apparatus according to claim 4, further comprising two banks, which serve to classify the cylinder groups, that branch off from the engine in a V-shape.

6. The fuel injection amount control apparatus according to claim 1, wherein:
the operating state detector is provided with an engine rotational speed detector that detects a rotational speed of the engine; and
the amount of air distributed is calculated based on the detected amount of air and the detected rotational speed of the engine.

7. The fuel injection amount control apparatus according to claim 6, further comprising:
an air-fuel ratio sensor that detects an air-fuel ratio of mixture in each of the cylinder groups provided in an exhaust passage for each of the cylinder groups; and
an air-fuel ratio feedback corrector that further corrects the corrected fuel injection amount, which has been corrected based on the detected air-fuel ratio, to perform feedback control such that the air-fuel ratio of mixture in each of the cylinder groups becomes a desired air-fuel ratio.

8. The fuel injection amount control apparatus according to claim 7, further comprising two banks, which serve to classify the cylinder groups, that branch off from the engine in a V-shape.

9. The fuel injection amount control apparatus according to claim 1, further comprising:
an air-fuel ratio sensor that detects an air-fuel ratio of mixture in each of the cylinder groups provided in an exhaust passage for each of the cylinder groups; and
an air-fuel ratio feedback corrector that corrects the corrected fuel injection amount, which has been corrected based on the detected air-fuel ratio, to perform feedback control such that the air-fuel ratio of mixture in each of the cylinder groups becomes a desired air-fuel ratio.

10. The fuel injection amount control apparatus according to claim 9, further comprising two banks, which serve to classify the cylinder groups, that branch off from the engine in a V-shape.

11. The fuel injection amount control apparatus according to claim 1, further comprising:

an air-fuel ratio sensor that detects an air-fuel ratio of mixture in each of the cylinder groups provided in an exhaust passage for each of the cylinder groups; and
an air-fuel ratio feedback corrector that further corrects the corrected fuel injection amount, which has been corrected based on the detected air-fuel ratio, to perform feedback control such that the air-fuel ratio of mixture in each of the cylinder groups becomes a desired air-fuel ratio.

12. The fuel injection amount control apparatus according to claim 1, wherein:
a variable valve timing mechanism that changes a valve timing of the engine is further provided;
the operating state detector is provided with an engine rotational speed detector that detects a rotational speed of the engine and a valve timing detector that detects a valve timing of the engine; and
the amount of air distributed is calculated based on the detected amount of air, the detected rotational speed of the engine and the detected valve timing.

13. A system for determining a fuel injection amount for an internal combustion engine having a plurality of cylinders that are classified into at least two cylinder groups, comprising:
a fuel injection amount sub-system that determines an amount of fuel injected from each of the cylinder groups based on an amount of air provided to a common intake passage of the engine;
a distributed air amount sub-system that determines an amount of air distributed to each of the cylinder groups based on an operating state of the engine; and
a corrected fuel injection amount sub-system that determines a corrected fuel injection amount based on the determined amount of air distributed.

14. The system according to claim 13, wherein the corrected fuel injection amount sub-system makes a correction so as to increase the determined fuel injection amount in accordance with an increase in the determined amount of air distributed.

15. The system according to claim 14, wherein the amount of air distributed is determined based on the amount of air and a rotational speed of the engine.

16. The system according to claim 15, further comprising an air-fuel ratio feedback sub-system that further corrects the corrected fuel injection amount, which has been corrected based on an air-fuel ratio, to perform feedback control such that the air-fuel ratio of mixture in each of the cylinder groups becomes a desired air-fuel ratio.

17. The system according to claim 16, further comprising two banks, which serve to classify the cylinder groups, that branch off from the engine in a V-shape.

18. The system according to claim 13, wherein the amount of air distributed is determined based on the amount of air and a rotational speed of the engine.

19. The system according to claim 18, further comprising an air-fuel ratio feedback sub-system that further corrects the corrected fuel injection amount, which has been corrected based on an air-fuel ratio, to perform feedback control such that the air-fuel ratio of mixture in each of the cylinder groups becomes a desired air-fuel ratio.

20. The system according to claim 19, further comprising two banks, which serve to classify the cylinder groups, that branch off from the engine in a V-shape.

21. The system according to claim 13, further comprising an air-fuel ratio feedback sub-system that corrects the corrected fuel injection amount, which has been corrected based on an air-fuel ratio, to perform feedback control such that the air-fuel ratio of mixture in each of the cylinder groups becomes a desired air-fuel ratio.

22. The system according to claim 21, further comprising two banks, which serve to classify the cylinder groups, that branch off from the engine in a V-shape.

23. The system according to claim 13, further comprising an air-fuel ratio feedback sub-system that further corrects the corrected fuel injection amount, which has been corrected based on an air-fuel ratio, to perform feedback control such that the air-fuel ratio of mixture in each of the cylinder groups becomes a desired air-fuel ratio.

24. The system according to claim 13, wherein the amount of air distributed is determined based on the amount of air, a rotational speed of the engine and a valve timing of the engine.

25. A method for controlling a fuel injection amount for an internal combustion engine having a plurality of cylinders that are classified into at least two cylinder groups, the method comprising:

detecting an amount of air supplied to a common intake passage for the engine;

detecting an operating state of the engine;

determining an amount of fuel injected from each of the cylinder groups based on the detected amount of air;

determining an amount of air distributed to each of the cylinder groups based on the detected operating state;

determining a corrected fuel injection amount based on the calculated amount of air distributed; and injecting fuel into each of the cylinder groups based on the corrected fuel injection amount.

26. The method according to claim 25, wherein the fuel injection amount is increased in accordance with an increase in the amount is increased of air distributed.

27. The method according to claim 25, wherein the amount of air distributed is determined based on the amount of air and a rotational speed of the engine.

28. The method according to claim 25, further comprising:

detecting an air-fuel ratio in an exhaust passage for each of the cylinder groups; and further correcting the corrected fuel injection amount, which has been corrected based on the air-fuel ratio, to perform feedback control such that the air-fuel ratio in each of the cylinder groups becomes a desired air-fuel ratio.

29. The method according to claim 25, further comprising detecting a rotational speed of the engine and a valve timing of the engine; and determining the amount of air distributed based on the detected amount of air, the detected rotational speed of the engine and the detected valve timing.

* * * * *